E. SPENCER.

Hand-Stamps.

No. 5,863. Reissued May 5, 1874.

Witnesses.

Ernst Bilhuber.
W. J. Payton.

Inventor.

Cyrus N. Pratt (Assignee of Edgerard Spencer)
Per Sackett & Hand
Attys

AM. PHOTO-LITHOGRAPHIC Co. N.Y. (OSBORNE'S PROCESS.)

UNITED STATES PATENT OFFICE.

EDWARD SPENCER, OF ST. LOUIS, MISSOURI, ASSIGNOR TO CYRUS N. PRATT, OF CHICAGO, ILLINOIS.

IMPROVEMENT IN HAND-STAMPS.

Specification forming part of Letters Patent No. 34,378, dated February 11, 1862; reissue No. 5,863, dated May 5, 1874; application filed November 21, 1873.

*To all whom it may concern:*

Be it known that I, EDWARD SPENCER, of St. Louis, in the county of St. Louis and State of Missouri, has invented a new and useful Improvement in Hand-Stamps; and I hereby declare the following to be a full, clear, and exact description thereof, which will enable those skilled in the art to make and use the same, reference being had to the accompanying drawing forming part of this specification, in which drawing—

Figure 1:
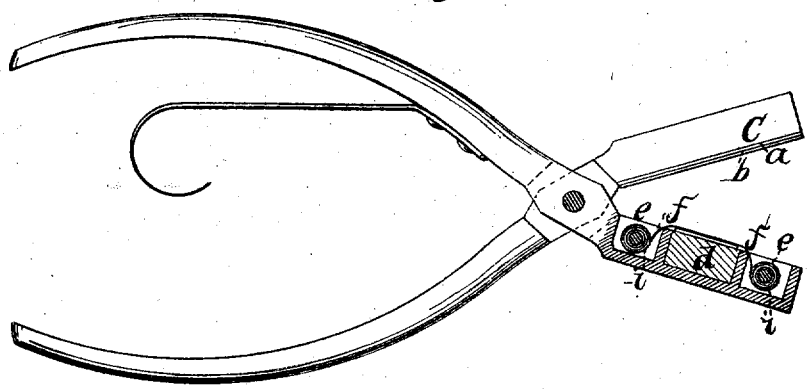
Figure 2:
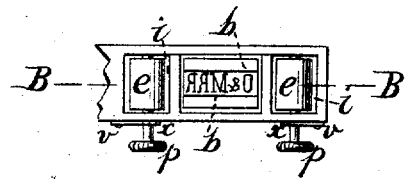

Figure 1 represents a side elevation of this invention, showing also a section in the line B B, Fig. 2. Fig. 2 is the face of one of the jaws.

Similar letters indicate corresponding parts.

This invention consists in the arrangement in a hand-stamp of two reels to which the ends of an inking-ribbon are attached, in combination with a die or types situated between said rollers or reels, and with a yielding printing-surface, in such a manner that, by such yielding printing-surface, the inking-ribbon is preserved against injury, and that said inking-ribbon can be used for a long time for the purpose of supplying the die or types with the requisite quantity of ink to produce distinct impressions.

The stamp which forms the subject-matter of this invention is made in the form of a pair of pinchers, as shown in Fig. 1. In the inside face of one of these pinchers are made three cavities, the center cavity being made to receive the die *d*, while in each of the end cavities *i i* is fixed a roller or reel, *e*. The shafts of these reels project through one side of the jaw, and have collars or buttons *p p* made on them, by which they can be turned. Each shaft has a ratchet-wheel, *x*, on it in which the pawl *v* works. The letters to be stamped on a card or other material are made on or fixed as types in the die *d*. On the reels *e e* a ribbon, *f f*, is placed, so as to stretch from one roller to the other over the face of the type, one end of said ribbon being fastened to each of the reels. The ribbon is saturated with ink and it is drawn tight over the type and around the rollers by means of the pawls and the ratchet-wheels before mentioned, and it is made of considerable length, being wound around the reels, by which means it can be moved over the face of the type so as to provide them with a fresh supply of ink. Against the face of the second jaw C is fixed a piece of buckskin or other soft material, producing a yielding surface for the type to press against. By this yielding printing-surface the inking-ribbon is preserved from injury, whereas, by a rigid printing-surface, the ribbon is liable to be cut by the action of the type, so that it becomes useless in a short time. On the side of each jaw is fixed a knife, one of which is shown at *b*, Fig. 1. These knives work together like a pair of shears, and they serve to cut off the card or material at the same time the impression is made by the dies or types.

What I claim as new, and desire to secure by Letters Patent, is—

1. In combination with a hand-stamp, having type or die *d* and two reels to which the ends of the inking ribbon are attached, finger-pieces for advancing and stretching the ribbon over the die or types, substantially as described.

2. The combination, in a hand-stamp, of two reels, to which the ends of an inking-ribbon are attached, with a chase or die and with two hinged jaws, one of which contains the reels and the chase or die, while the other contains the platen, said reels being provided with finger-pieces for stretching and advancing the ribbon, and the jaws being subjected to the action of a spring that has a tendency to throw the same open, substantially as described.

E. SPENCER.

Witnesses:

JNO. M. WIRTS,
JOHN GREEN.